United States Patent [19]

Bruns et al.

[11] Patent Number: 5,284,349

[45] Date of Patent: Feb. 8, 1994

[54] CAB STEP ASSEMBLY

[75] Inventors: Mark W. Bruns; Wesley W. Bruns, both of Gibbon, Minn.

[73] Assignee: May-Wes Manufacturing, Inc., Gibbon, Minn.

[21] Appl. No.: 983,785

[22] Filed: Nov. 30, 1992

[51] Int. Cl.⁵ .................................................. B60R 3/02
[52] U.S. Cl. .................................. 280/166; 280/164.1; 182/91
[58] Field of Search ............... 280/163, 164.1, 166; 182/91; 244/129.6

[56]         References Cited
       U.S. PATENT DOCUMENTS

| 1,102,287 | 7/1914  | Moller.          |         |
|-----------|---------|------------------|---------|
| 1,118,584 | 11/1914 | Roebuck et al.   | 280/163 |
| 1,471,972 | 10/1923 | Miller           | 280/166 |
| 2,146,668 | 2/1939  | Baade.           |         |
| 2,453,937 | 11/1948 | Ray.             |         |
| 2,458,618 | 1/1949  | McDonald         | 182/91 X |
| 2,951,454 | 9/1960  | Candlin, Jr..    |         |
| 4,275,664 | 6/1981  | Reddy            | 280/166 X |
| 4,416,486 | 11/1983 | McNaught et al.  | 280/163 X |
| 4,453,684 | 6/1984  | Hanks.           |         |
| 4,482,113 | 11/1984 | Backlund et al.  | 280/166 X |
| 4,842,325 | 6/1989  | Irelan.          |         |

FOREIGN PATENT DOCUMENTS

| 3920527 | 7/1990 | Fed. Rep. of Germany | 280/166 |
| 245229  | 1/1926 | United Kingdom       | 280/166 |

Primary Examiner—Brian L. Johnson
Attorney, Agent, or Firm—Burd, Bartz & Gutenkauf

[57]         ABSTRACT

A crop sprayer cab has a step assembly facilitating ingress and egress of the operator into and out of the cab. The step assembly has floor and step sections operable for movement between an up, closed position and a down, step position relative to the floor of the cab. Links connected to the cab floor and the floor section limit downward movement of the step section and allow the step assembly to be moved to a closed position. A hand operated lever is operable to pivot the step assembly to the up, closed position.

22 Claims, 4 Drawing Sheets

CAB STEP ASSEMBLY

FIELD OF INVENTION

The invention relates to a vehicle cab having a step assembly to facilitate the operator to enter and exit from the cab.

BACKGROUND OF THE INVENTION

Crop sprayers are provided with operator enclosures to shield the operator from the outside environment and provide for operator comfort. The cabs are mounted on the vehicle frame a substantial distance above the ground to clear crops, such as corn and soybeans. Fixed steps and upright ladders are mounted on the side of the cab to enable the operator to climb into the cab. The ladders extend down from the cabs and can contact crops and other objects on the ground. Upright ladders are difficult to use as the operator must use his or her hands and feet to climb the ladder. Railway cars have been provided with side steps, which pivot to a down position to facilitate the movement of passengers into and out of the railway cars. Examples of side steps on railway cars as shown by E. M. Moller in U.S. Pat. No. 1,102,287 and B. C. Baade in U.S. Pat. No. 2,146,668. These patents show a step assembly having two steps that are pivoted between a down, step position to an up, closed position adjacent the side of the railway car.

SUMMARY OF INVENTION

The invention relates to a step assembly for a structure such as a cab of a vehicle having a floor with an opening aligned with a doorway open to the interior of the cab. The step assembly is pivotally connected to the floor to allow a person to walk into and out of the cab in a safe and convenient manner. The step assembly includes a floor section having a size to close the opening in the floor and a step section joined to the floor section. The floor section is connected to the floor or frame of the vehicle for movement between an up, closed position wherein the opening in the floor is closed and the floor section is aligned with the floor and a down step position wherein the step section is generally horizontal below the plane of the floor. A foldable linkage retains the step assembly in the step position. A lift lever is used to raise the floor and step sections to the closed position and retain the step assembly in its closed position.

The step assembly is incorporated in a vehicle cab having a frame including a side wall and a doorway. A door hinge to the side wall closes the doorway. The floor and side wall below the doorway have an opening which is selectively opened and closed with a step assembly. The step assembly has a floor section and a step section. The step section extends upwardly and outwardly from the floor section. The floor section and step section are complimentary in shape to the size and shape of the opening in the floor and side wall so that when the step assembly is in its up, closed position, the opening is closed. A hinge pivotally connects the floor section to the frame to allow the floor section and step section to move between an up closed position and a down step position. When the step assembly is in the step position, the step section is located generally horizontal below the doorway and the horizontal plane of the floor. Links having longitudinal slots along the length thereof are pivotally connected to the frame adjacent the opening in the floor outwardly of the hinge. Second pivot members connect the floor section through the slots in the links whereby the links limit downward pivoting movement of the floor and step sections. The links fold to generally horizontal positions when the step assembly is in the up position. A latch assembly, including a lever, pivoted to the floor for movement between a down position and an up position is connected with a rod to the floor section so that when the lever is in the down position, the floor section and step section are in the down step position. When the lever is moved to the up position, the floor and step sections are in the up, closed positions. A retainer fixed to the floor or other fixed structure holds the lever in the up position. The lever can be released from the retainer to allow it to be moved to the down position thereby moving the step assembly to the down step position.

DESCRIPTION OF PREFERRED EMBODIMENT

Figure 1:
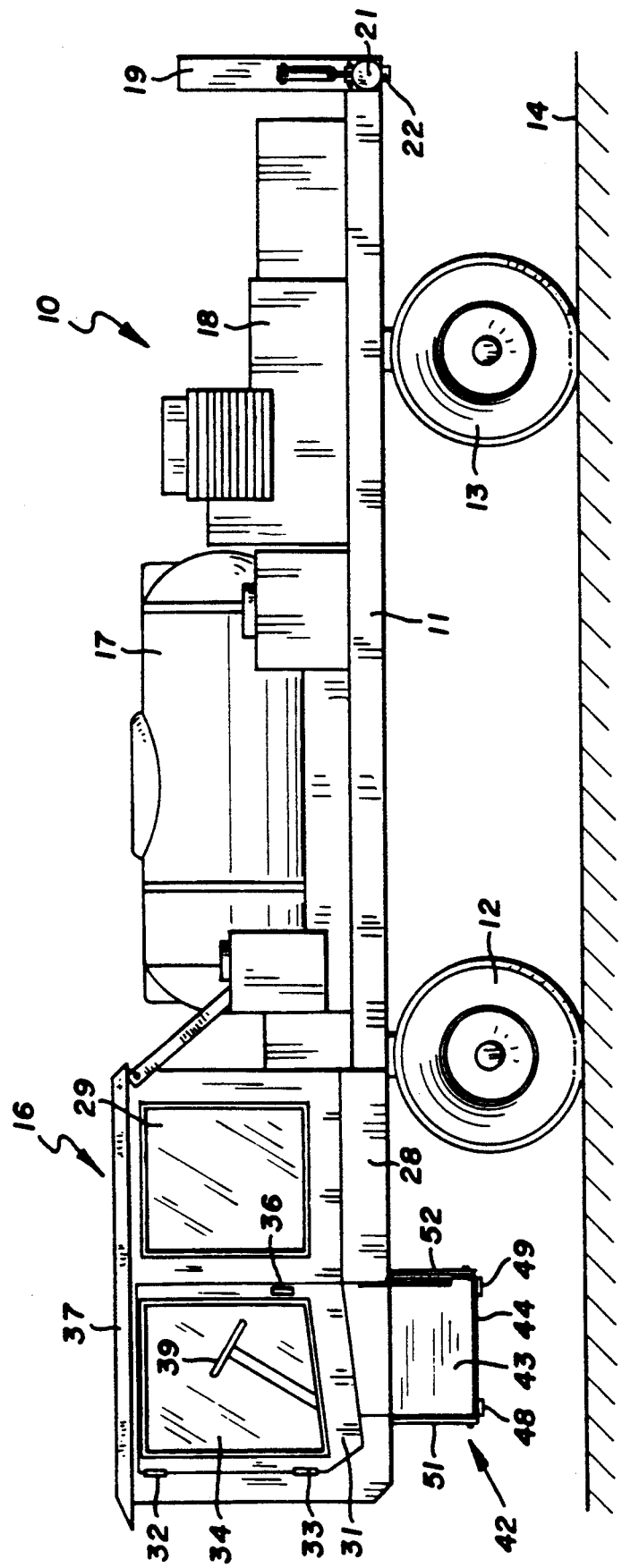
FIG. 1 is a side elevational view of crop sprayer including the cab incorporating the cab step assembly of the invention.

Referring to FIG. 1, there is shown a vehicle indicated generally at 10, commonly known as a crop sprayer for dispensing particulate insecticides, herbicides and like chemicals onto crops and the ground. Vehicle 10 has a longitudinal frame 11 movably supported on the ground 14 with a pair of front and rear wheels 12 and 13. The rear wheels 13 are power driven with hydraulic motors (not shown) under the control of the operator seated in the cab indicated generally at 16. The front wheels 12 are used to steer the vehicle 10.

Cab 16 is mounted on the forward end of frame 11 in front of a tank 17 carrying the material to be dispensed on the ground. A motor driven pump 18 operates to deliver the material under pressure to spraying apparatus 19 mounted on the rear portion of frame 11. Spraying apparatus has a plurality of booms 21 supporting spraying nozzles 22 that direct liquid particulates toward ground 14. Other types of spraying mechanisms can be used to dispense the material onto crops and/or the ground.

Cab 16 is an enclosure having an upright front wall 23 accommodating a windshield 24. A pair of headlights 25 are located below windshield 24 to provide light for the operator under nocturnal conditions. A first side wall 26 extends rearwardly and outwardly from front wall 23 and has an upright side window 27. The rear portion of side wall 26 has an additional window (not shown). A second side wall 28, as seen in FIG. 1, has a rear side window 29 and a door 31 A pair of hinges 32 and 33 pivotally mount door 31 on the front portion of side wall 28. Door 31 has a window 34 and is held in a closed position with a latch 36. The enclosure has a generally upright rear wall having a window (not shown) to allow the operator to view the spraying operation. The entire enclosure is covered with a roof 37 to enclose interior chamber 38. Chamber 38 is the drivers compartment which includes the steering column 39, as seen in FIG. 1, the driver's seat, and controls for the motor driven pump and the drive wheels 13 (not shown). The vehicle controls are conventional structures that do not form part of the invention. Front wall 23, side walls 26 and 27 and the rear wall are attached to a generally horizontal bottom wall or floor 41 that is mounted on the frame of cab 16. The frame for cab 16 can be mounted on the front of vehicle frame 11.

Figure 2:
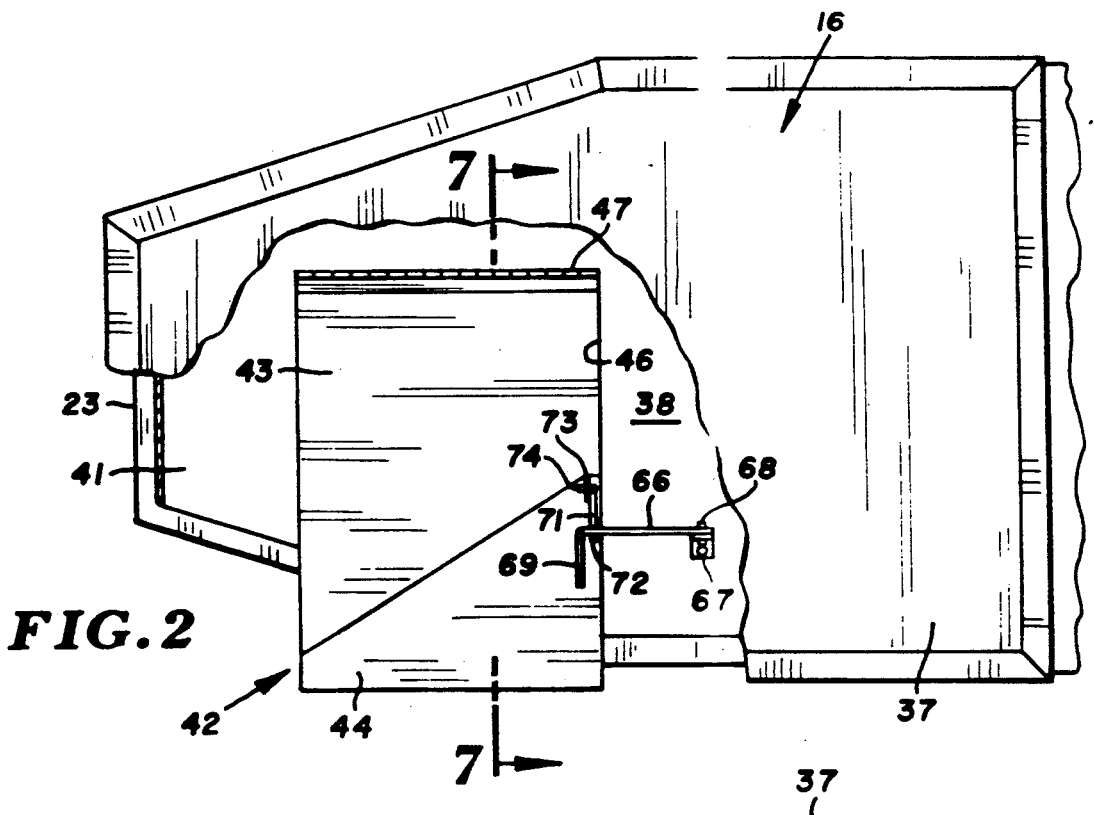
FIG. 2 is an enlarged plan view of the cab partly broken away to show the step assembly.
Figure 3:
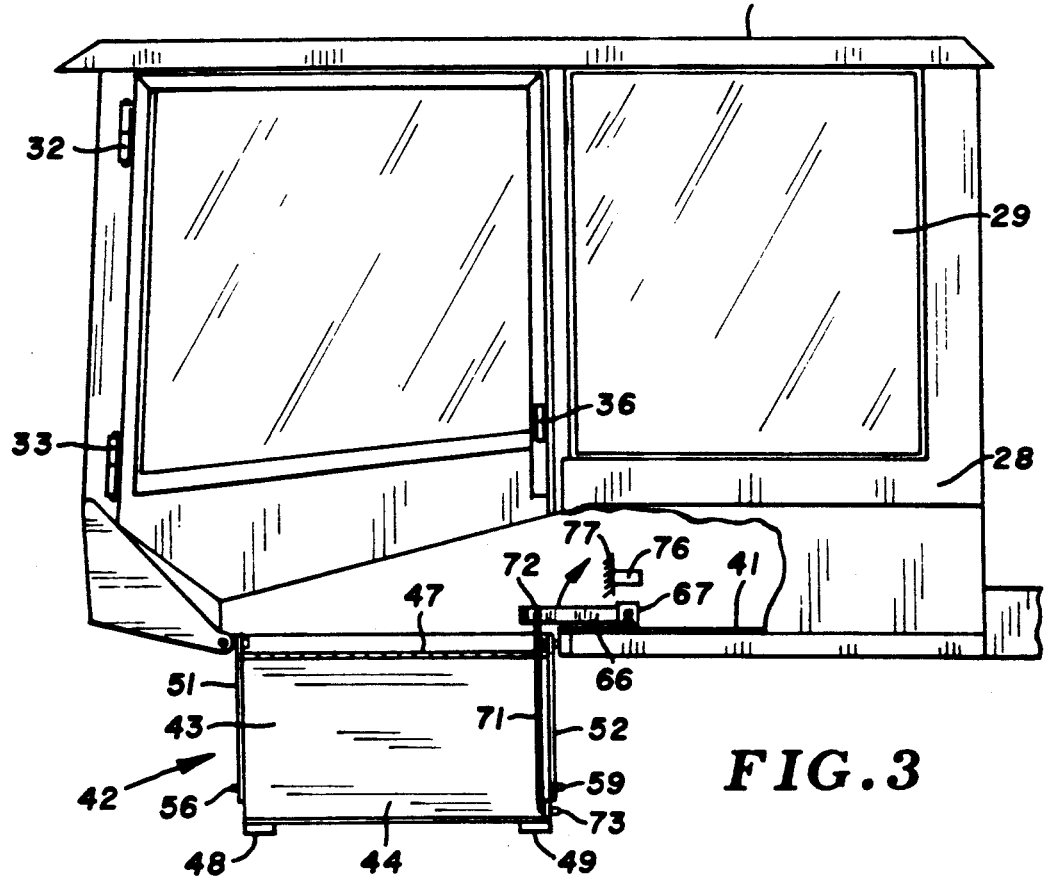
FIG. 3 is a side elevational view of the cab with the step assembly in the down position.
Figure 4:
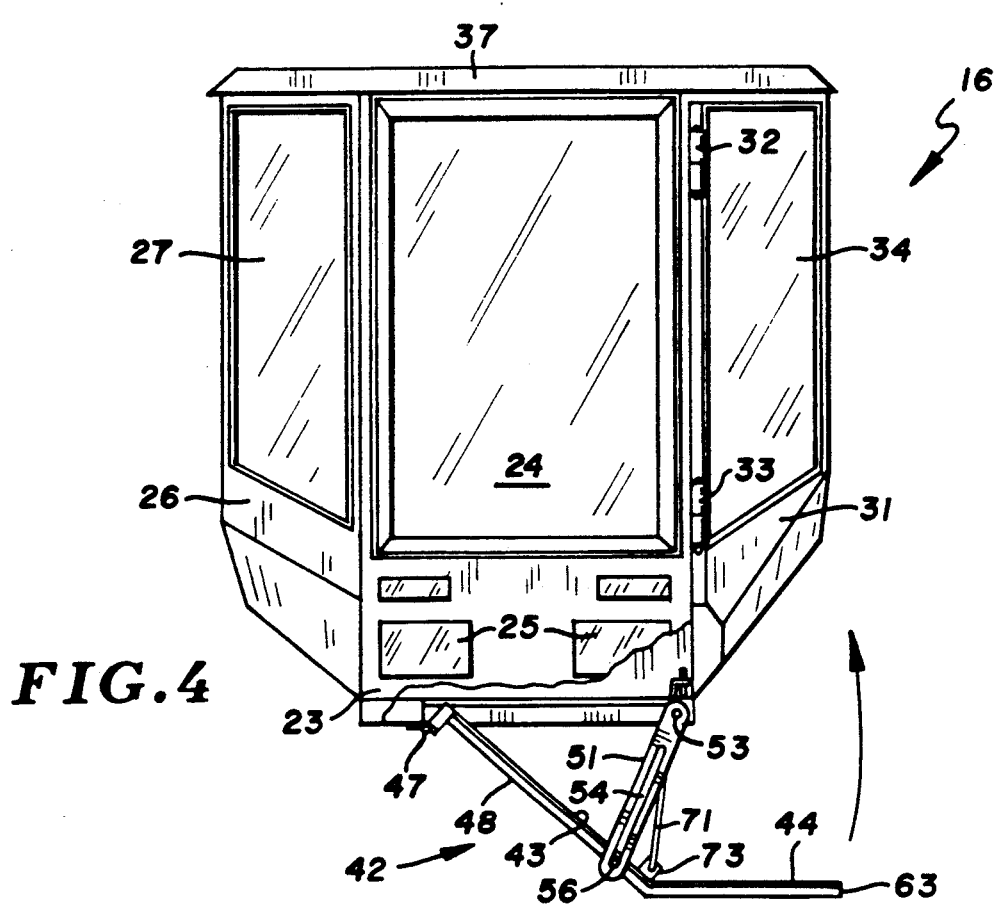
FIG. 4 is front elevational view of the cab with the step assembly in the down position.
Figure 5:
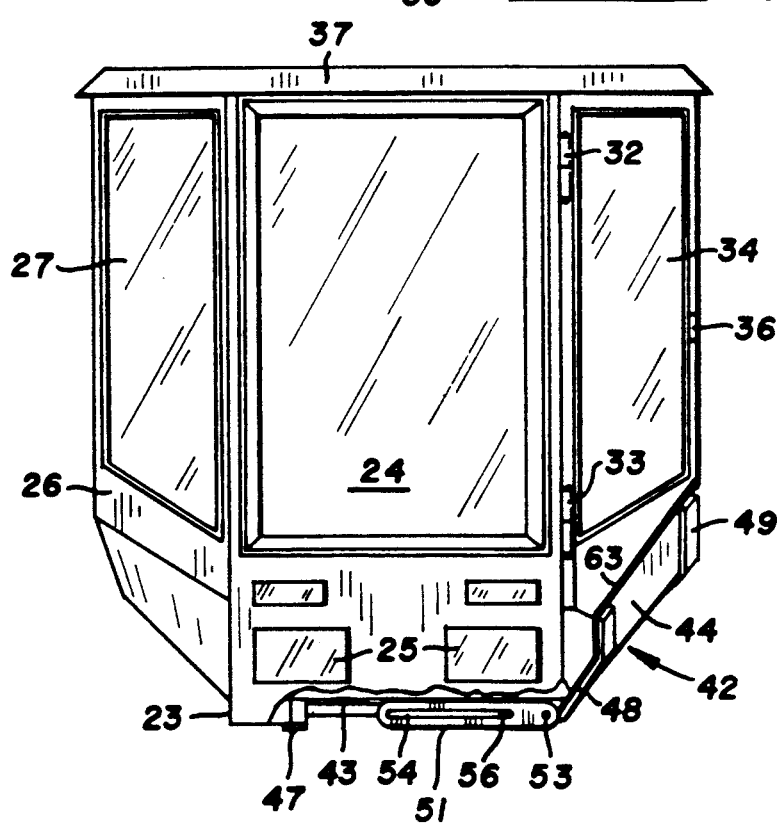
FIG. 5 is a front elevational view of the car with the step assembly in the up position.

Referring to FIGS. 2 and 3, there is shown a step assembly indicated generally at 42 movable mounted on floor 41 for movement from an up, closed position to a down step position. The step position is shown in FIGS. 2, 3 and 4. Step assembly 42 has a floor section 43 joined to a step section 44. Sections 43 and 44 are a one-piece panel having a diagonal fold section joining floor section 43 with step section 44. As seen in FIG. 3, when step assembly 42 is in the down step position, step section 44 is generally horizontal and below the horizontal plane of floor 41 in alignment with opening 46 in floor 41. Floor section 43 extends upwardly from the horizontal step section 44 to a transverse hinge 47 that pivotally connects the floor and step sections 43 and 44 to the frame supporting floor 41. Floor sections 43 and 44 fit into an opening 46 in floor 41 and side wall 28 and are complementary in size and shape to opening 46, as seen in FIG. 2. Opening 46 has a generally rectangular shape and extends to the bottom of door 31. Doorway for door 31 is coextensive with opening 46. Part of opening 46 is in side wall 28 below door 31. Floor section 43 and step section 44 are attached to beams or supports 48 and 49 that extend along opposite edges of sections 43 and 44 from the outer edge of section 44 to the inner or hinged end of section 43.

Figure 6:
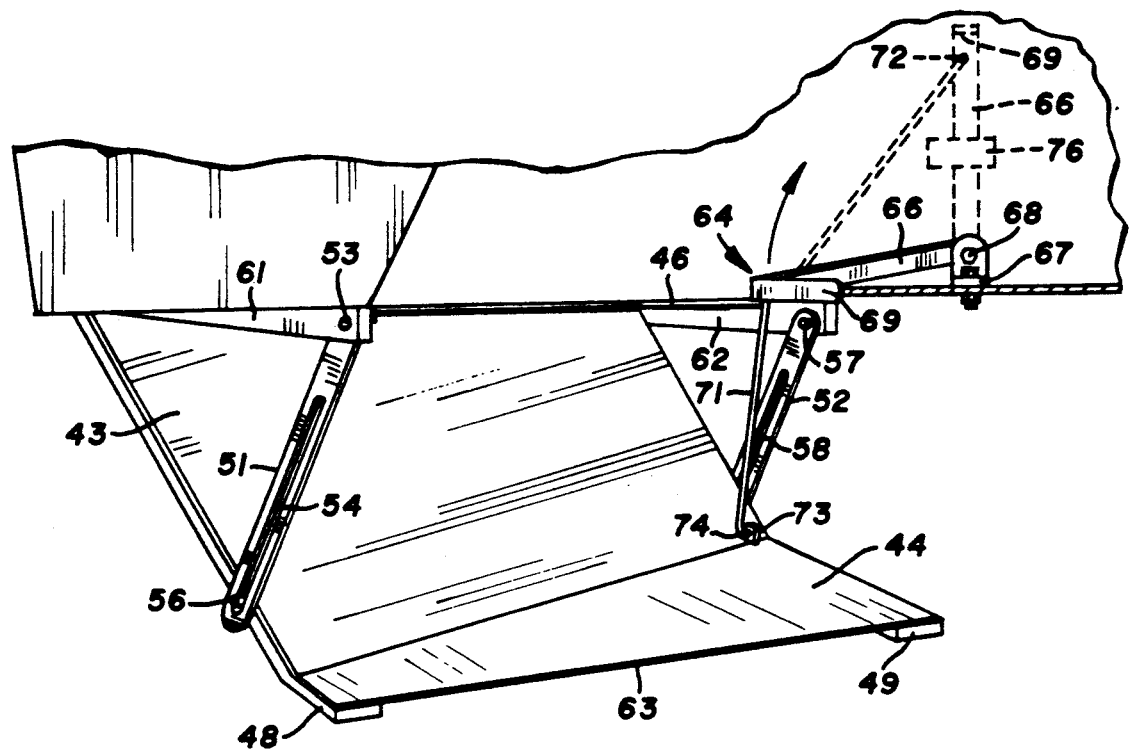
FIG. 6 is an enlarged perspective view of the step assembly in the down position.

Step assembly 42 is retained in the down step position by pair of links 51 and 52 operable to limit the downward pivotal movement of the floor and step sections 43 and 44. As seen in FIGS. 4 and 6, link 51 is joined to a frame cross support 61 with a first pivot member 53. The mid-section of link 51 has a longitudinal slot 54 that accommodates a second pivot member 56 joined to beam 48. Second link 52 is pivotally joined with a first pivot member 57 to cross support 62. Link 52 has a longitudinal slot 58 that accommodates a second pivot member 59, as seen in FIG. 3. Links 51 and 52 are inclined downwardly and inwardly from their support pivots 53 and 57 with the lower pivot members 56 and 59 resting on the bottom of slots 51 and 58 to hold the floor and step sections 43 and 44 in the down step position. Step section 44 is in the horizontal position, as shown in FIG. 4. When floor and step sections 43 and 44 are moved to the up or closed position, links 51 and 52 pivot upwardly and are in a generally horizontal position adjacent the bottom of floor 41 next to the cross supports 61 and 62. Floor section 43 is coextensive with floor 41 thereby providing a floor board or foot support for the operator of the vehicle. The top outer edge 63 of step section 44 is located adjacent the bottom edge of the door 31 to close opening 46.

Figure 7:
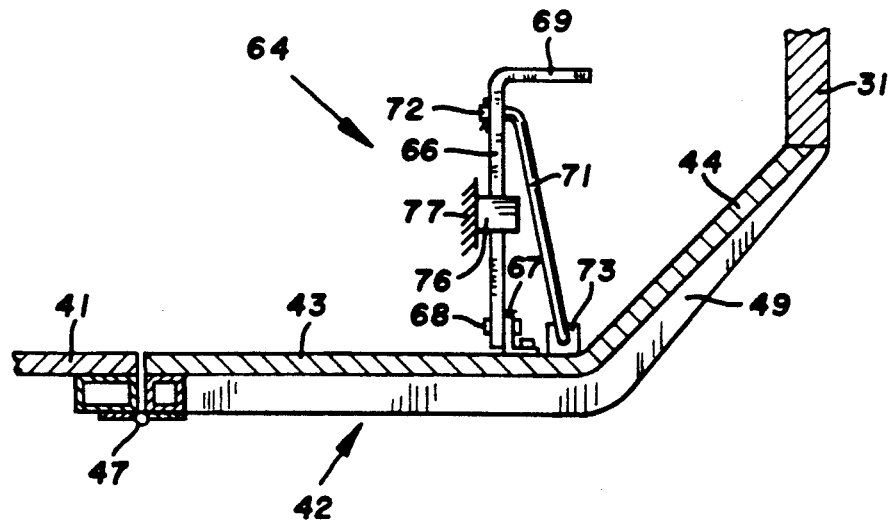
FIG. 7 is an enlarged sectional view taken along the line 7—7 of FIG. 2.

Step assembly 42 is retained in the closed position with a latch apparatus indicated generally at 64. As seen in FIGS. 6 and 7, latch apparatus 64 has a lever 66 pivoted to a bracket 67 with a pivot bolt 68. Bracket 67 is secured to floor 41. The outer end of lever 66 has a laterally outwardly projected handle 69 used by the operator to pivot lever 66 from a generally horizontal position to a vertical position to close step assembly 42. Lever 66 is connected to floor section 43 with an elongated rod 71. The upper end 72 of rod 71 projects through a hole in the outer end of lever 66 and is retained therewith on suitable fasteners such as a snap ring, cotter key and the like. The lower end of the rod is pivotally connected to a bracket 73 attached, to floor section 43. A fixed retainer 76 comprising a short offset plate is attached to a fixed or stationary support 77 adjacent the seat for accommodating the operator. Retainer 76 holds lever 66 in a generally upright position thereby holding floor section 43 generally horizontal and in coextensive relationship relative to floor 41 and closing opening 46 into the operator's compartment. Lever 66 is released from retainer 76 by moving lever 66 rearwardly and bending lever 66 slightly outwardly so that it clears retainer 76. Lever 66 can then be moved to a generally horizontal position thereby lowering the floor section 43 and positioning the step section in a generally horizontal position. Links 51 and 52 serve as stops to fix the down position of the step assembly as shown in FIG. 6.

The step assembly herein described constitutes a preferred embodiment of the invention, it is to be understood that changes in parts, materials, structures and arrangements of structure may be made by one skilled in the art without departing from the scope of the invention. The invention is defined in the following claims.

We claim:

1. A step assembly for a vehicle cab having a frame, a side wall including a doorway, and a door hinged to the side wall for closing the doorway, said doorway having an opening below the door when the door is closed, and a floor having an opening aligned with the doorway comprising: floor means having a size to close the opening in the floor, step means joined to the floor means for closing the opening in the side wall below the door, hinge means pivotally connecting the floor means to the frame to allow the floor means and step means to move between an up, closed position wherein the openings in the floor and side wall are closed and a down, step position wherein the step means is located generally horizontal below the doorway, means connected to the floor means and frame for holding the floor means and step means in the down, step position, and means connected to the floor means and floor for holding the floor means and step means in the up, closed position, said means for holding the floor means and step means in the down, step position comprise links having longitudinal slots along the length thereof, first pivot members connecting the links to the frame adjacent the opening in the floor outwardly of the hinge means, second pivot members connected to the floor means and extended through said slot sin the links, said second pivot members being located in the bottom of said slots when the floor means and step means are in the down, step position thereby limiting downward pivoting of the floor means and step means and located in the upper portion of said slots when the floor means and step means are in the up, closed position.

2. The step assembly according to claim 1 wherein: the floor means is a generally flat floor member having an inner portion and an outer portion and the step means is a generally flat step member joined to the outer portion of the floor member, said hinge means being secured to the inner portion of the floor member.

3. The step assembly according to claim 2 wherein: the step member extends upwardly and outwardly from the floor member when the floor means and step means are in the up, closed position.

4. A step assembly for a vehicle cab having a frame, a side wall including a doorway, and a door hinged to the side wall for closing the doorway, said doorway having an opening below the door when the door is closed, and a floor having an opening aligned with the doorway comprising: floor means having a size to close the opening in the floor, step means joined to the floor means for closing the opening in the side wall below the door, hinge means pivotally connecting the floor means to the frame to allow the floor means and step means to move between an up, closed position wherein the openings in the floor and side wall are closed and a down, step position wherein the step means is located generally horizontal below the doorway, means connected to the floor means and frame for holding the floor means and step means in the down, step position, and means connected to the floor means and floor for holding the floor means and step means in the up, closed position, said means for holding the floor means and step means in the up, closed position includes lever means pivoted to the floor of the vehicle cab for movement between a down position and an up position, rod means connecting the lever means to the floor means of the step assembly whereby when the lever means is in the down position, the floor means and step means are in the down, step position and when the lever means is in the up position, the floor means and the step means are in the up, closed position, and retainer means for holding the lever means in the up position.

5. The step assembly of claim 4 wherein: the floor means and step means are a on-piece panel having a floor member, a step member and a fold section joining the floor member to the step member.

6. The step assembly of claim 5 wherein: the step member extends upwardly and outwardly from the floor member when the floor member and step member are in the up, closed position, and said fold section extends diagonally across said panel.

7. A step assembly for a vehicle cab having a frame, a side wall including a doorway, and a door hinged to the side wall for closing the doorway, said doorway having an opening below the door when the door is closed, and a floor having an opening aligned with the doorway comprising: floor means having a size to close the opening in the floor, step means joined to the floor means for closing the opening in the side wall below the door, hinge means pivotally connecting the floor means to the frame to allow the floor means and step means t move between an up, closed position wherein the openings in the floor and side wall are closed an a down, step position wherein the step means is located generally horizontal below the doorway, means connected to the floor means and frame for holding the floor means and step means in the down, step position, and means connected to the floor means and floor for holding the floor means and step means in the up, closed position, said means for holding the floor means and step means in the down, step position comprise link means having slots along the length thereof, first pivot means connecting the link means to the frame adjacent the opening in the floor outwardly of the hinge means, second pivot means connected to the floor means and extended through said slots in the link mean for limiting downward pivoting of the floor means and step means to fix the down, step position thereof, said means for holding the floor means and stp means in the up, closed position includes lever means pivoted to the floor of the vehicle cab for movement between a first position and a second position, means connecting the lever means to the floor means whereby when the lever means is in the first position, the floor means and step means are in the down, step position and when the lever means is in the second position the floor means and step means are in the up, closed position, and retainer means for holding the lever means in the second position.

8. A step assembly for a structure having a floor with an opening comprising: step means connected to the floor to allow a person to walk onto the floor, said step means including a floor section having a size to close the opening in the floor and a step section joined to the floor section, means connecting the floor section to the floor for movement of the floor section between a closed position wherein the opening in the floor is closed and a step position wherein the step section is generally horizontal below the plane of the floor, first means connected to the step means for holding the floor section and step means and floor for holding the floor section and step section in the closed position, said first means for holding the floor section and step section in the step position comprises link means having longitudinal slots along the length thereof, first pivot means connecting the link means to the floor adjacent the opening in the floor outwardly of the means connecting the floor section to the floor and second pivot means connecting the step means to the link means, said second pivot means extended through said slot in the link means, and providing stops for limiting movement of the step means thereby retaining the step means in the step position.

9. The step assembly of claim 8 wherein: the floor section is a generally flat floor member having an inner portion and an outer portion, and the step section is a generally flat step member joined to the outer portion of the floor member, said means connecting the floor section to the floor comprising a hinge means secured to the inner portion of the floor member and the floor.

10. The step assembly of claim 9 wherein: the step member extends upwardly and outwardly from the floor member when the floor section is in the closed position.

11. A step assembly for a structure having a floor with an opening comprising: step means connected to the floor to allow a person to walk onto the floor, said step means including a floor section having a size to close the opening in the floor and a step section joined to the floor section, means connecting the floor section to the floor for movement of the floor section between a closed position wherein the opening in the floor is closed and a step position wherein the step section is generally horizontal below the plane of the floor, first means connected to the step means for holding the floor section and step section in the step position, and second means connected to the step means and floor for holding the floor section and step section in the closed position, said second means for holding the step means in the closed position includes lever means pivoted to the floor of the structure for movement between a down position and an up position, rod means connecting the lever means to the step means whereby when the lever means is in the down position, step means is in the step position and when the lever means is in the up position, the step means is in the closed position, and retainer means for holding the lever means in the up position.

12. The step assembly of claim 11 wherein: the floor section and step section is a one-piece panel having a floor member, a step member and a fold section joining the floor member to the step member.

13. The step assembly of claim 12 wherein: the step member extends upwardly and outwardly from the floor member when the step means is in the closed position, and as said fold section extends diagonally across said panel.

14. A step assembly for a structure having a floor with an opening comprising: step means connected to the floor to allow a person to walk onto the floor, said step means including a floor section having a size to close the opening in the floor and a step section joined to the floor section, means connecting the floor section to the floor for movement of the floor section between a closed position wherein the opening in the floor is closed and a step position wherein the step section is generally horizontal below the plane of the floor, first means connected to the step means for holding the floor section and step section in the step position, and second means connected to the step means and floor for holding the floor section and step section in the closed position, said first means for holding the step means in the step position comprises link means having slots along the length thereof, first pivot means connecting the link means to the floor adjacent the opening in the floor outwardly of the means connecting the floor section to the floor, second pivot means connected to the step means and extended through said slots in the link means for limiting downward movement of the step means to fix the step position thereof, said second means for holding the step means in the closed position include lever means pivoted to the floor of the structure for movement between a first position and a second position, means connecting the lever means to the step means whereby when the lever means is in the first position, the step means is in the step position and when the lever means is in the second position, the step means is in the closed position, and retainer means for holding the lever means in the second position.

15. A vehicle cab comprising: a frame, a side wall mounted on the frame, said side wall having an upright doorway, a door mounted on the side wall for movement between open and closed position, said doorway having an opening below the door when the door is closed, a floor located in a generally horizontal plane, said floor having an opening aligned with the doorway, a step assembly having a floor section or closing the opening in the floor and a step section joined to the floor section for closing the opening in the side wall below the door, hinge means pivotally connecting the floor section to the frame to allow the floor section and step section to move between closed positions wherein the floor section is located in the horizontal plane of the floor to close the opening in the floor and the step section is located in the opening in the side wall to close the opening in the side wall and a step position wherein the floor section extends downwardly and the step section is located generally horizontal below the doorway, first means connected to the step assembly and frame to hold the floor section and step section in the step position, and second means connected to the step assembly and floor operable to move the floor section and step section to the closed positions and retain said floor section and step section in the closed positions.

16. The vehicle cab of claim 15 wherein: the floor section is a generally flat floor member having an inner portion and an outer portion, and the step section is a generally flat step member joined to the outer portion of the floor member, said hinge means secured to the inner portion of the floor member and the frame.

17. The vehicle cab of claim 16 wherein: the step member extends upwardly and outwardly from the floor member when the floor section is in the closed position.

18. The vehicle cab of claim 15 wherein: the first means for holding the floor section and step section in the step position comprises link means having longitudinal slots along the length thereof, first pivot means connecting the link means to the floor adjacent the opening in the floor outwardly of the hinge means connecting the floor section to the frame and second pivot means connecting the step assembly to the link means, said second pivot means extended through said slot sin the link means and providing stops for limiting movement of the step assembly thereby retaining the step section in the step position.

19. The vehicle cab of claim 15 wherein: the second means for holding the step assembly in the closed position includes lever means pivoted to the floor for movement between a down position and an up position, rod means connecting the lever means to the step assembly whereby when the lever means in a down position, the step section is in the step position and when the lever means is in the up position, the step assembly is in the closed position, and retainer means for holding the lever means in the up position.

20. The vehicle cab of claim 15 wherein: the floor section and step section is a one-piece panel having a floor member, a step member and a fold section joining the floor member to the step member.

21. The vehicle cab of claim 20 wherein: the step member extends upwardly and outwardly from the floor member and said fold section extends diagonally across said panel when the step assembly is in the closed position.

22. The vehicle can of claim 15 wherein: the first means for holding the step assembly in the step position comprises link means having slots along the length thereof, first pivot means connecting the link means to the floor adjacent the opening in the floor outwardly of the hinge means connecting the floor section to the frame, second pivot means connected to the step assembly and extended through said slots in the link means for limiting downward movement of the step means to fix the step position thereof, said second means for holding the step assembly in the closed position includes lever means pivoted to the floor for movement between a first position and a second position, means connecting the lever means to the step assembly whereby when the lever means is in the first position, the step assembly is in the step position and when the lever means is in the second position, the step assembly is in the closed position, and retainer means for holding the lever means in the second position.

* * * * *